Feb. 24, 1959 J. E. CANDLIN, JR 2,874,647
LATERAL MOVEMENT CONTROL
Filed March 16, 1956 3 Sheets-Sheet 3
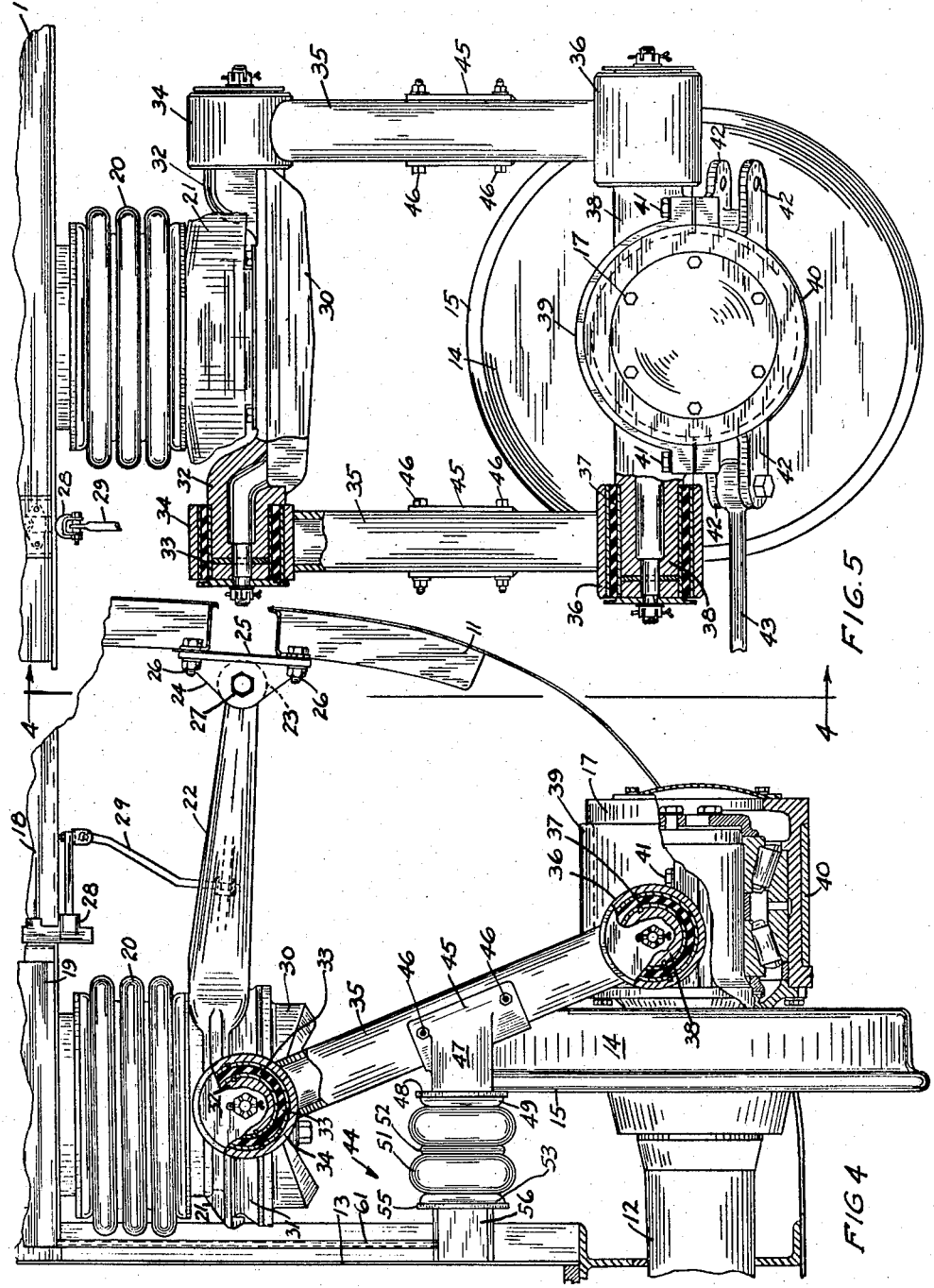
INVENTOR
JAMES E. CANDLIN JR.
BY Cromwell, Greist & Warden
ATTORNEYS United States Patent Office 2,874,647
Patented Feb. 24, 1959

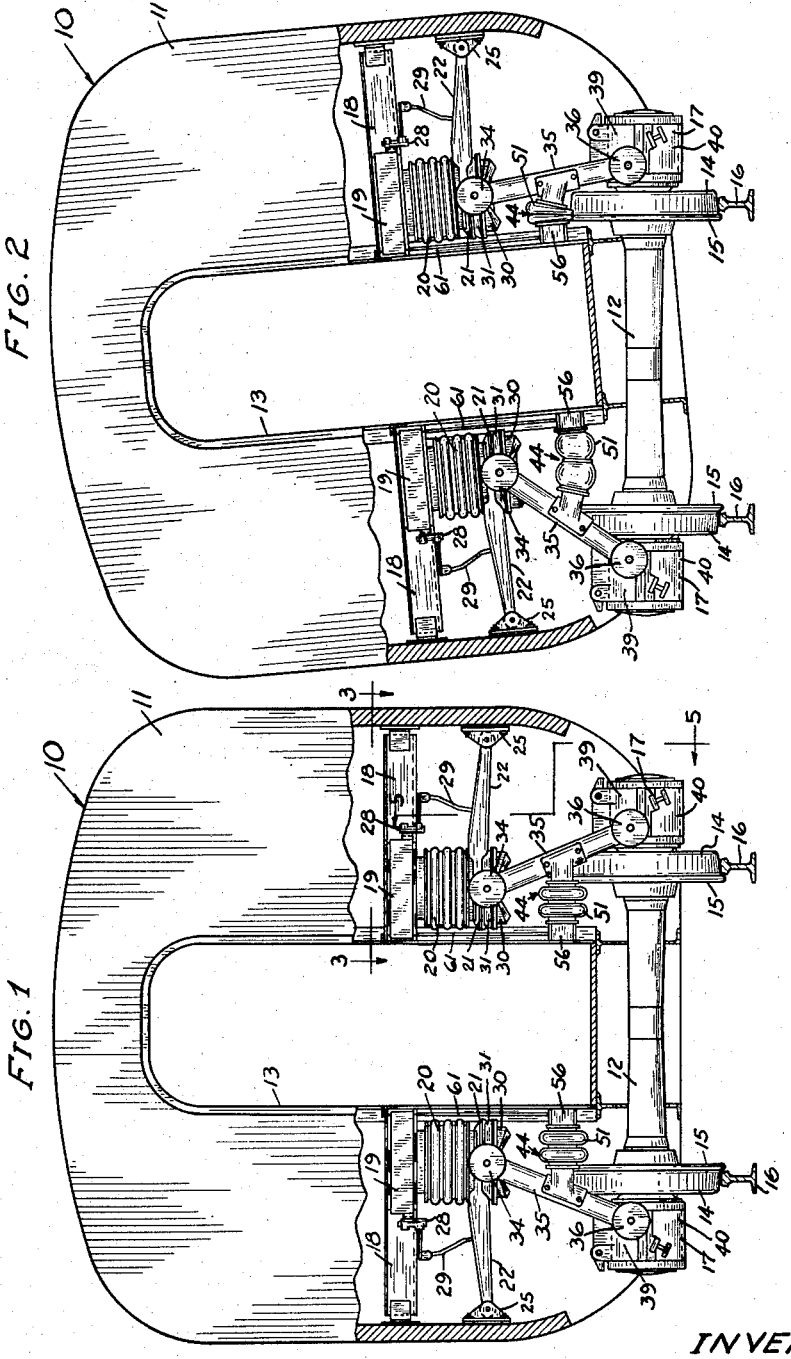

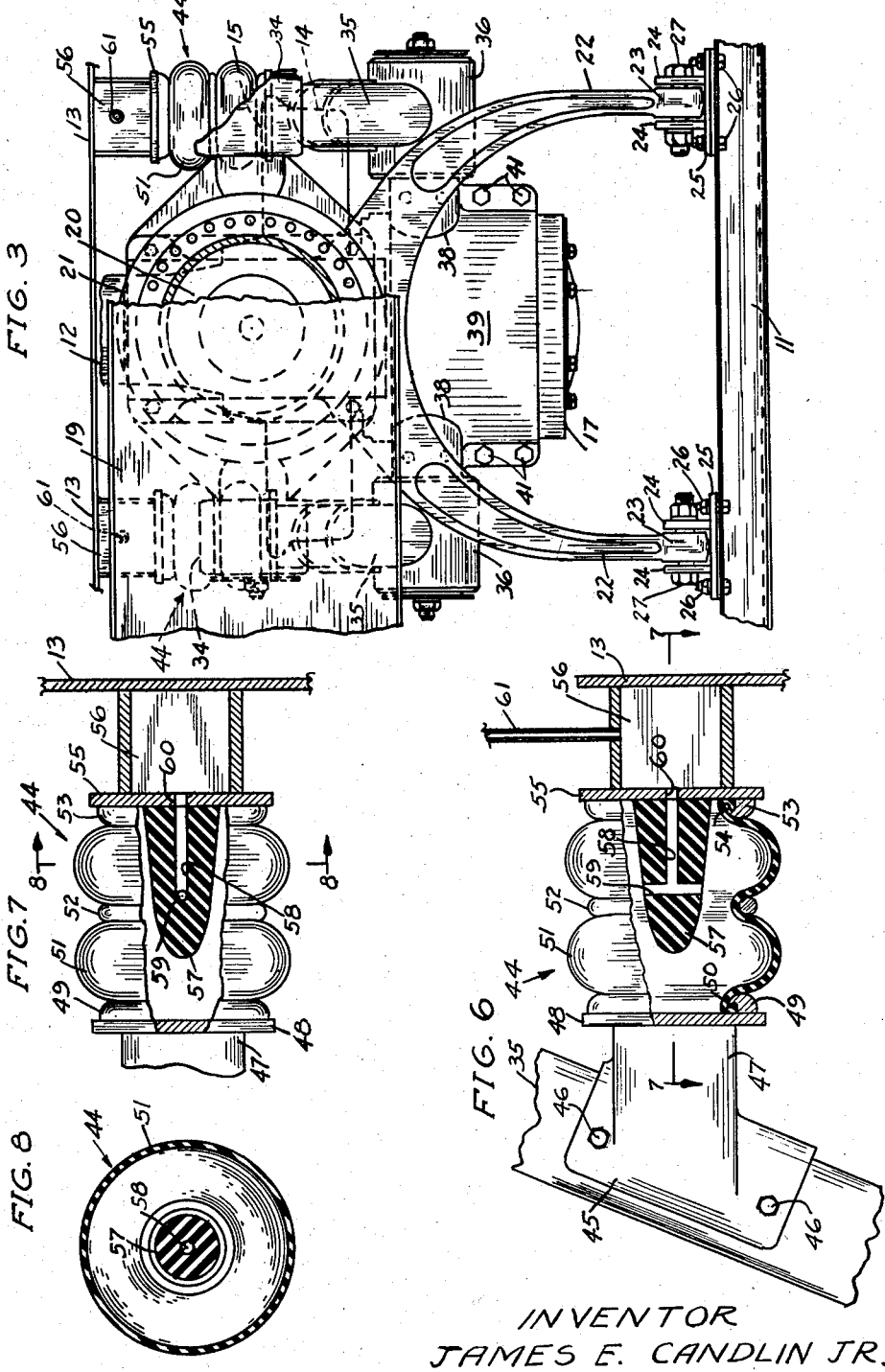

2,874,647

LATERAL MOVEMENT CONTROL

James E. Candlin, Jr., Lansing, Ill., assignor to Pullman-Standard Car Manufacturing Company, Chicago, Ill., a corporation of Delaware Application March 16, 1956, Serial No. 571,866

21 Claims. (Cl. 105—171)

The present invention relates generally to an improved suspension system for mounting a vehicle body with respect to a wheel-carrying axle, which suspension system acts to maintain the vehicle body in an upright position while allowing the same to bank or roll laterally with respect to the axle in response to centrifugal force acting on the vehicle body when the vehicle negotiates a curve. More specifically, the present invention is directed to an improved suspension system and a lateral movement control and limiting means which functions to normally maintain a vehicle body in an upright position while allowing the same to roll or bank laterally with respect to a wheel-carrying axle associated therewith when the vehicle negotiates a curve.

While the specific embodiment of the present invention to be described is directed to a suspension system used in single axle railway cars of the lightweight, high speed variety, it should be understood that the improved suspension system and the lateral movement control means may be used with any type of vehicle body wherein it is desired to allow the body to bank in response to the action of centrifugal force when the vehicle rounds a curve. Still further, it should be understood that the particular vehicle body lateral movement control means to be described, which forms the essence of the present invention, may be used in many different forms of suspension systems and the particular suspension system to be described as incorporating this improvement is merely illustrative of a single form of suspension system capable of exhibiting improved operation by the inclusion of the control means.

In line with the present emphasis on low cost, lightweight design and high speed operation, advances have been made in the railway industry in the development of lightweight, high speed trains which are formed primarily from a plurality of single axle railway cars being interconnected with one another in load-bearing support. These cars are provided with coupler-supported ends and wheel-supported ends which latter ends utilize a single axle for support. Due primarily to the lightweight features of these cars, trains formed from such cars may be operated at higher speeds and, as a result, efforts have been made to mount the car body with respect to its axle so as to allow the car body to bank under the influence of centrifugal force when the same is rounding a curve. The banking feature afforded by the suspension system greatly improves the safety factor in the operation of such trains as well as improving the riding comfort of the passengers.

One form of suspension system which has been found to be highly efficient in operation and capable of relatively low cost manufacture as well as inexpensive maintenance is the type of system which pivotally mounts the car body on elements movable in a plane about the pivots which is transverse of the longitudinal axis of the car body. Resilient biasing means are used in the pivotal connections to normally urge the car body into an upright position. The resilient biasing means are in the form of rubber torsion units which allow connecting elements to pivot relative to one another thereby placing the resilient biasing material of the units, such as rubber, under the influence of torsional stresses. The torsion assemblies act to maintain the car body in an upright position during straight-away operation and yield in response to shearing or torsional stresses applied thereto when the car body is subjected to the action of centrifugal force upon the rounding of a curve. Once the negotiation of a curve has been completed and the centrifugal force dissipated, the inherent resiliency of the material of the rubber torsion assemblies act to bias the elements associated therewith to an extent that the car body is returned to an upright position.

The biasing strength of torsion assemblies of this nature is fixed with respect to its magnitude upon the manufacture of the assemblies and, as a result, these assemblies are not adjustable except by replacement with assemblies of greater or less fixed biasing strength. Normally, the assemblies will be capable of properly biasing a car body under the very heaviest load conditions. In the event that a car is carrying a load less than the maximum load, the lateral ride and capacity to properly bank upon the negotiation of a curve will be hindered as the resistance to torsional stresses caused by centrifugal force is designed for full-load conditions. Still further, the lateral ride is affected by variations in temperature conditions under which the car is operated. For example, extremely low temperatures will result in stiffening the resilient material of the torsion assemblies to an extent that the lateral ride, even under full-load conditions, is affected. If assemblies are initially made less stiff to compensate for low temperature conditions, these same assemblies may not efficiently be used under normal or higher temperature conditions due to their inherent weakness and loss of stiffness attributable to higher temperatures. To continuously replace the torsion assemblies with assemblies of varying resilient ratings, depending upon the load and temperature conditions under which the car is to be operated, results in costly maintenance.

It is an object of the present invention to provide an improved suspension system capable of allowing a vehicle body to efficiently bank or roll laterally with respect to a wheel-carrying axle in response to the action of centrifugal force regardless of variations in load carried by the vehicle or temperature conditions under which the vehicle is operated.

Another object is to provide an improved suspension system for supporting a vehicle body with respect to an axle while allowing relative movement therebetween, which system includes the use of a vehicle body roll or banking control means capable of cooperating with elements of the suspension system to normally bias the vehicle body into an upright position while at the same time limiting the total degree of body roll or banking of the vehicle body in response to the action of centrifugal force when the vehicle is negotiating a curve.

Still another object is to provide an improved suspension system for mounting a vehicle body with respect to an axle while allowing relative movement therebetween, which system includes the use of rubber torsion units in combination with a lateral movement control means capable of cooperatively biasing the vehicle body into an upright position while allowing the same to roll or bank when subjected to the action of centrifugal force upon the negotiation of a curve.

A further object, in addition to the foregoing, is to provide an improved suspension system which utilizes fluid pressure operated vertical and lateral body movement control means operatively cooperating with one another to control movement of the vehicle body relative to its supporting axle, the suspension system being further provided with rubber torsion assemblies which in cooperation with the lateral movement control means normally urges the vehicle body into an upright position.

Still a further object is to provide a lateral movement control means particularly adapted for use in suspension systems which resiliently mount a vehicle body with respect to an axle and allow the vehicle body to roll or move laterally with respect to the axle in response to the action of centrifugal force upon the negotiation of a curve, said lateral movement control means being adapted to predeterminedly limit the extent of roll or lateral movement of the vehicle body and further normally function to bias the same into an upright position.

Other objects not specifically set forth will become apparent from the following detailed description made in conjunction with the drawings wherein:

Fig. 1 is an end elevation partially broken away and in section of a single axle railway car of the lightweight, high speed variety illustrating an improved suspension system utilizing the lateral movement control means of the present invention;

Fig. 2 is an end elevation similar to Fig. 1 illustrating the extent of body roll or lateral movement of the car body afforded by the suspension system as the car negotiates a curve in the track;

Fig. 3 is an enlarged fragmentary plan view of a side assembly of the suspension system taken generally along line 3—3 of Fig. 1;

Fig. 4 is an enlarged fragmentary end elevation in partial section of the side assembly of Fig. 3 taken generally along line 4—4 of Fig. 5;

Fig. 5 is an enlarged fragmentary side elevation in partial section of the side assembly of Fig. 3 taken generally along line 5—5 of Fig. 1;

Fig. 6 is an enlarged fragmentary end elevation in partial section of one of the improved lateral movement control means of the suspension system;

Fig. 7 is a fragmentary partial section of the lateral movement control means of Fig. 6 generally taken along line 7—7 of Fig. 6 and Fig. 8 is a cross sectional view of the lateral movement control means taken along line 8—8 of Fig. 7.

Referring in particular to Figs. 1 and 2, a single axle railway car 10 is shown having a car body 11 supported at one end with an axle 12. The car body 11 is provided with a passageway frame 13 and the axle 12 carries laterally spaced wheels 14 each being provided with wheel flanges 15 riding the inner surfaces of spaced rails 16. The car body 11 is resiliently mounted on journal boxes 17 carried by the outer ends of the axle 12 by a suspension system which includes identical, laterally spaced side assemblies formed from parts symmetrically located on opposite sides of the passageway frame 13 which are identified by the same reference numerals.

Transverse supports 18 extend between the outer surface of the passageway frame 13 and the shell of the car body 11 and each of the supports 18 carries fluid pressure reservoirs 19 which are connected to the top portions of vertically acting, resilient springs 20 or shock absorbers which support the weight of the car body 11. The springs 20 are each formed from a bellows-like rubber portion which is internally pressurized by a fluid pressure, such as air, delivered thereto from a reservoir 19. The amount of pressure carried by the air springs 20 will vary depending upon the load carried by the car 10. As a result, the air pressure carried by the springs 20, which is delivered from a suitable supply source not shown, will control the vertical positioning of the car body 11 with respect to the axle 12.

The air springs 20 are restrained longitudinally of the car body 11 by means of yokes 21 which are connected to the lower portion of each of the air springs 20 and are provided with outwardly directed spaced restraining links or arms 22 in the form of wishbones which are attached at their outermost ends to the inner surface of the shell of the car body 11. The outermost ends of the arms 22 are provided with eyes 23 which are received between spaced ears 24 carried by plates 25 which, in turn, are attached to the inner surface of the shell of the car body 11 by bolts 26. Rubber bushed bolts or pins 27 pass through the ears 24 and eyes 23 to attach the arms 22 to the car body 11 and allow the same to pivot in a vertical plane with respect thereto. As a result, the yoke 21 may move upwardly and downwardly with its associated air spring 20 while at the same time restraining the air spring 20 from movement longitudinally of the car body 11.

The air pressure carried by the reservoirs 19 in communication with the interior of the springs 20 is supplied from a source which in turn is controlled by a leveling valve 28 (see Figs. 1 and 2) provided with a valve operating linkage 29 having an end thereof attached to one of the arms 22. Because of this arrangement, the amount of air pressure carried by the air springs 20 to maintain the car body 11 in its proper relation with the axle 12 will be controlled by the relative positioning existing between the reservoirs 19 and the arms 22. As the load of the car 10 increases, the springs 20 will be compressed and the reservoirs 19 will move toward the arms 22. This relative movement will operate the valve linkages 29 to open the valves 28 thereby increasing the air pressure within the reservoirs 19 from a suitable air pressure supply source. Upon increase of the air pressure in the springs 20, the same will be expanded and the car 10 will automatically adjust itself in response to the load carried thereby with respect to its vertical positioning relative to the axle 12.

As particularly shown in Figs. 4 and 5, a reinforced plate 30 is associated with each of the air springs 20 below the yoke 21. To interconnect the yoke 21 and plate 30, a resilient rubber cushion 31 (see Fig. 4) is associated with the opposed surfaces of the elements thereby interconnecting the same and providing resilient relative movement between the same to allow the plate 30 to limitedly move with respect to the air spring 20 and the yoke 21. The particular use made of this limited movement will be subsequently described.

The plates 30 are provided with trunnions 32 which receive thereabout rubber torsion sleeve assemblies 33, some of which are illustrated in Figs. 4 and 5. The outer periphery of the rubber torsion sleeve assemblies 33 are received within cylindrical sleeves 34 which are integral with the upper ends of downwardly and outwardly directed struts 35. The rubber torsion sleeve assemblies 33 are each formed from an intermediate sleeve of resilient rubber material which has bonded to its inner and outer surfaces rigid metal sleeves, which in turn are keyed against relative movement with respect to a trunnion 32 and a cylindrical sleeve 34. The intermediate rubber sleeve of the torsion sleeve assembly 33 is subjected to shearing action and resiliently yields to the same thereby allowing a cylindrical sleeve 34 and associated strut 35 to limitedly rotate about a trunnion 32 under conditions to be described. The inherent resiliency of the intermediate rubber sleeve biases a cylindrical sleeve 34 and its associated strut 35 back into its original position with respect to a trunnion 32 when the torsional stresses are removed.

The remaining ends of the struts 35 are similarly provided with cylindrical sleeves 36 which internally receive rubber torsion sleeve assemblies 37 of construction similar to the rubber torsion sleeve assemblies 33. The inner peripheries of the rubber torsion sleeve assemblies 37 are received about the outer periphery of trunnions 38 which are integral with saddle members 39 received about the top surfaces of the journal boxes 17. The inner and outer rigid metallic sleeves of the rubber torsion sleeve assemblies 37 are keyed to the trunnions 38 and the cylindrical sleeves 36, respectively, thereby allowing the struts 35 to limitedly rotate about the trunnions 38. Upon the removal of rotative forces applied to the struts 35, the inherent resiliency of the inner torsion sleeve of the torsion sleeve assemblies 37 will cause the struts 35 to return to their original position with respect to the trunnions 38. The top saddle members 39 are connected to bottom saddle members 40 by means of bolts 41 and these combined saddle members substantially encase the journal boxes 17. The bottom saddle members 40 are provided with pairs of spaced ears 42 which may be pivotally connected to a steering rod or radius rod 43 as shown in Fig. 5. The rod 43 may be a part of an axle steering mechanism which does not form a part of the present invention.

Intermediate the ends of each of the struts 35 are horizontally extending lateral movement control means 44 which form the essence of the present invention and which are of similar construction. For purposes of description only one of such lateral movement control means 44 is shown in Figs. 6-8. Referring in particular to Fig. 6, a portion of a strut 35 is shown therein as being provided with a mounting plate 45 attached thereto by bolts 46. The plate 45 is provided with an integral horizontally extending cylindrical portion 47 which carries on the outermost end thereof a vertically directed rigid plate 48. The outer surface of the plate 48 carries a clincher rim 49 which is provided about the inner periphery thereof with an inturned, circumferentially continuous clamping rim 50 which clamps an end margin of a flexible rubber bellows 51 to the outer surface of the plate 48 in sealed engagement therewith. The bellows 51 forms an outer compressible portion which is centrally restricted by a retainer ring 52 and is attached at its remaining end by a second clincher rim 53 which is provided about the inner periphery thereof with an inturned clamping arm 54 receiving the remaining outer margin of the bellows 51 and fastening the same to a rigid plate 55 in sealed engagement therewith. The plate 55 forms a side wall of an air reservoir 56 which is attached to the passageway frame 13 (see Figs. 1 and 2).

Internally positioned within the bellows 51 is a resilient abutment means 57 which is in the form of a cone-shaped protuberance being mounted on the inner surface of the rigid wall 55 and extending inwardly therefrom toward the opposite wall 48 while being spaced a substantial distance from the inner surface of the wall 48. The abutment means 57 is formed of resilient material adapted to be compressed to a predetermined degree upon contact with the wall 48 and is internally provided with a longitudinally extending passageway 58 which terminates at one end with a laterally extending passageway 59 which, in turn, has both of its ends in communication with the interior of the compressible portion 51. The remaining end of the longitudinally extending passageway 58 is aligned with a hole 60 in the wall 55 in communication with the interior of the reservoir 56. A tube or pipe 61 extends through the upper wall of the reservoir 56 into communication with the interior thereof and is further in communication with the interior of one of the reservoirs 19 at the other end thereof, as shown in Figs. 1 and 2. By reason of the pipe 61, each of the reservoirs 56 associated with each of the lateral movement control means 44 are in communication with their associated reservoirs 19 of the air springs 20. Because of this arrangement, equalization of air pressure exists between the associated reservoirs 19 and 56 and the bellows 51 are subjected to the same pressures as the air springs 20.

In the operation of the suspension system described above, the air springs 20 control the vertical positioning of the car body 11 with respect to the axle 12. Loads of various types introduced into the car body 11 cause the air springs 20 to compress as the initial air pressure carried thereby is inadequate to maintain the vertical relation of the car body 11 with respect to the axle 12. The air valves 28, being fixed with respect to the reservoirs 19, move downwardly with the car body 11 and the valve linkages 29, being fixed with respect to the arms 22, open the valves 28 to allow the introduction of air into the reservoirs 19 and ultimately into the springs 20 thereby increasing the air pressure carried by the springs 20 to an extent that the body 11 is raised to its initial position with respect to the axle 12, at which point the valves 28 are automatically closed. Upon a decrease in load the elements function in reverse to bleed the springs 20 of excess pressure. Because of this arrangement the vertical positioning of the car body 11 with respect to the axle 12 is automatically brought about in response to variations in the total weight of the car body 11.

The upper ends of the struts 35 are limitedly pivotally connected with the lower portions of the air springs 20 through the plates 30, cushions 31 and yokes 21. The lower ends of the struts 35 are limitedly pivotal at their points of association with the journal boxes 17. The rubber torsion sleeve assemblies 33 and 37 carried by the ends of the struts 35 aid in maintaining the car body 11 in an upright position due to the biasing action of the resilient sleeves carried thereby and at the same time allow the car body 11 to bank relative to the axle 12 in response to the action of centrifugal force when the car 10 negotiates a curve.

In Fig. 2, the car 10 is in the process of negotiating a portion of track which curves to the left as viewed. Centrifugal force acting on the car body 11 causes the same to bank inwardly of the curve, the lower portion of the car body 11 dipping downwardly and to the right and causing the struts 35 to move about their pivotal end connections in a clockwise direction. The restraining arms 22, forming a part of the yokes 21, maintain the air springs 20 substantially parallel to the vertical axis of the car body 11 and it is only the struts which move against the biasing action of the rubber torsion sleeve assemblies 33 and 37 to allow the car body 11 to bank into the curve. The centrifugal force acting on the car body 11 is adequate at given speeds of the car 10 to overcome the biasing action of the torsion sleeve assemblies 35 and 37 and promote limited pivotal action at the interconnections of the struts 35 to the plates 30 and the journal boxes 17. Upon completed negotiation of a curve, the magnitude of the centrifugal force is materially reduced to an extent that the inherent resiliency of the torsion sleeve assemblies 33 and 37 is re-asserted and these assemblies aid to bias the elements associated therewith to return the car body to an upright position.

As previously described, the rubber torsion sleeve assemblies 33 and 37 are fixed as to their magnitude of biasing strength during the manufacturing thereof. As a result, these assemblies may be provided with different ratings of resiliency and the particular rating used will depend upon the operating conditions to be encountered. With respect to single axle railway cars of the type described, these cars when coupled and fully loaded present the maximum weight, namely, 100% load, which must be moved laterally by the torsion sleeve assemblies 33 and 37 to urge and maintain the car body 11 in an upright position. It has been found that in the instance where the cars 10 are coupled in load-bearing support but are empty, the total weight moved amounts to approximately 75% of the coupled and fully loaded weight. For uncoupled, fully loaded cars, the percentage of total possible weight is 60% and for uncoupled, empty cars it is 45% of the maximum load.

Taking these figures into consideration, it may be readily seen that during the operation of a car 10 when it is coupled and only partially loaded, the rubber torsion sleeve assemblies 33 and 37 in use being rated for maximum conditions, namely, coupled and fully loaded, the lateral ride will not be as efficient except at extremely high speeds where the centrifugal force acting on the car body 11 is of a magnitude sufficient to make up for the missing weight present under fully loaded conditions. There will be a range of operation with respect to the speed of the car during which only limited banking of the car body 11 will occur as the torsional stresses applied to the rubber torsion sleeve assemblies 33 and 37 will be inadequate to properly overcome the inherent biasing strength of these units. In addition to the foregoing, temperature conditions materially affect the extent of banking possible. For example, the rubber torsion sleeve assemblies 33 and 37 may become 100% stiffer in cold weather operation and this stiffness added to the inherent resiliency of the assemblies, where, for example, the assemblies are rated for coupled and fully loaded conditions, materially reduces the speed range of operation during which the car body 11 will bank to a desired extent under the influence of centrifugal force.

Adjustments may be made depending upon the operating conditions by utilizing rubber torsion sleeve assemblies which are rated to function in line with the amount of weight carried by the car as well as the temperature conditions under which the car will be operated. However, reliance on this type of adjustment materially reduces utility of the car and in order to use the same under a different set of conditions it is necessary to replace the torsion sleeve assemblies with new assemblies rated to meet the new conditions of operation. It is this problem with which the present invention is particularly concerned and by the provision of the lateral movement control means 44 interconnected between the struts 35 and the passageway frame 13, the centering force necessary under varying operating conditions may be automatically maintained while continuously using the same specifically rated torsion sleeve assemblies 33 and 37 under variable load and temperature operating conditions.

The compressible portion 51 of each of the lateral movement control units 44 is subjected to internal air pressure of a magnitude equal to the air pressure carried by the air springs 20. The pipes 61 are connected to the reservoirs 19 and air under pressure is communicated through the reservoirs 56, apertures 60, passageways 58 and 59 into the interior of the bellows 51. The air pressure acts to maintain the plates 48 and 50 in spaced relation and as the plate 48 is fixed with respect to a strut 35, the air pressure acts between a strut and the car body 11 to urge the latter into an upright position. The action of the air pressure in the bellows 51 cooperates with the biasing action of the torsion sleeve assemblies 33 and 37 to normally maintain the car body 11 in an upright position. The centering force asserted by each of the lateral movement control units 44 is measured by the air springs 20, the internal pressure of which is measured by the total weight of the car body as previously described.

As a result of the cooperation of the lateral movement control units 44 with the rubber torsion sleeve assemblies 33 and 37, the latter assemblies may be rated for coupled and no-load conditions which will normally amount to about 45% of the total weight of the car 10 in a coupled and fully loaded condition. The torsion sleeve assemblies 33 and 37 having a comparatively low resilient rating may be permanently used under varying conditions even to an extent of full-load and low temperature operation conditions. The added stiffness supplied to the rubber torsion sleeve assemblies 33 and 37 as a result of low temperature operation will not be sufficient to materially affect the riding comfort with respect to the ability of the car 10 to bank upon the rounding of curves at comparatively high speed operation. The cooperating centering forces supplied by the lateral movement control units 44 will vary depending upon the over-all weight of the car 10. For example, in the event that the car 10 is coupled and fully loaded, the air pressure carried by the air springs 20 will be at a maximum and a corresponding air pressure will be carried by the lateral movement control units 44 thereby increasing their car centering strength. Upon the carrying of lighter loads by the car 10, the centering forces of the lateral movement control units 44 will be proportionately reduced, the air pressure carried thereby being equalized with the air pressure carried by the air springs 20, and efficient body roll or banking of the car body 11 will occur.

The use of abutment means 57 within the bellows 51 supplies a means for limiting the total body roll of the car body 11 regardless of the speed of operation and the magnitude of the centrifugal force acting on the car body 11. As viewed in Fig. 2, upon the banking of the car body 11 the right hand lateral movement control unit 44 is compressed and the left hand unit 44 is expanded to a like degree. Upon compression of the units 44, the plate 55 carrying the abutment means 57 is moved toward the plate 48 and ultimately the abutment means 57 abuts the inner surface of the plate 48 and is compressed against the same. The abutment means 57 is preferably formed from resilient rubber material capable of being compressed and of resiliently re-attaining its original shape upon the movement of the plate 55 away from the plate 48. Upon compression of the abutment means 57, the passageway 59 is collapsed and passageway 58 is closed with respect to the interior of the bellows 51. This cuts off the supply of air pressure to the interior of the bellows 51 and the air carried thereby is trapped therein. This feature eliminates the possibility of building up sufficient air pressure within the bellows 51 to prevent the car body 11 from continuing its banking action to a desired extent during negotiation of a curve. The compressibility of the abutment means 57 taken into consideration with the spacing of the plates 48 and 55 predetermines the extent to which the car body 11 will bank upon the rounding of a curve and this extent is fixed so as to be adequate for the higher range of high speed operation. During operation of the car 10 at lower speeds the extent to which the car body 11 banks need not be as great to provide a comfortable ride. As a result, the combined centering action of the torsion sleeve assemblies 33 and 37 and the air pressure carried by the lateral movement control units 44 may not be completely overcome by the centrifugal force acting on the car body 11 during the rounding of a curve by the same and the car body 11 will bank only to the extent that the centrifugal force overcomes the centering action of the aforementioned units.

Once the car 10 has substantially completed the negotiation of a curve at high speed, the centrifugal force acting upon the car body 11 will become reduced in magnitude to an extent that the biasing action of the torsion sleeve assemblies 33 and 37 and the air pressure carried by the lateral movement control units 44 will re-assert themselves and act to move the car body 11 toward an upright position. The additional action of the centering forces provided by the lateral movement control units 44, which is automatically controlled by the weight of the car body 11, materially aids in providing a smooth and efficient lateral ride and allows the car 10 to be equipped for all-weather operation under variable load conditions. The car 10 is in effect weighed by the main air springs 20 and the centering force required is automatically chosen.

The provision of the top and bottom saddle members 39 and 40 allows the axle 12 and its associated wheels 14 and journal boxes 17 to be readily serviced or replaced without the necessity of disconnecting the suspension system from its relation with respect to the car body 11 or disconnecting the various elements thereof. The bottom saddle member 40 may be removed and the complete car body including its suspension system raised from load-bearing support with the journal boxes 17 thereby leaving the suspension system and the car body 11 intact while allowing complete, uninterfered servicing or replacement of the axle 12 or its associated parts.

To allow for the turning of the axle 12 with respect to the car body 11 to steer the wheels 14 into and out of a curve, the resilient cushions 31 are provided. The cushions 31 allow the plates 30 to tilt to a limited degree with respect to the yokes 21 without disturbing the positioning of the air springs 20. The inherent resiliency of the cushions 31 normally biases the axle 12 into a position at right angles to the longitudinal center line of the car 10. However, in the event that it is desired to positively steer the axle 12, the same may be turned with respect to the longitudinal center line of the car 10 by placing the cushion 31 under stress caused by turning forces imparted to the axle 12 through an axle steering mechanism including the steering rod 43. As a result of this arrangement the air springs 20 are not twisted or moved in a manner so as to interfere with their supporting action of the car body 11 and the remaining elements of the suspension system are capable of continued, uninterrupted efficient operation of the type previously described. The flexibility of the bellows 51 of the lateral movement control units 44 allows the struts 35 to follow the axle 12 upon the steering thereof without damage being done to the elements of the units 44 and without interfering with their efficient operation. The yokes 21 and restraining arms 22 being restricted from movement longitudinally of the car body 11 function to restrain the suspension system and axle 12 from movement as a complete unit longitudinally of the car body 11. The cushions 31 still further absorb the lateral components of impact forces transmitted axially of the struts 35 to prevent the transmission of these components into the body structure through the restraining arms 22.

Obviously many modifications and variations of the invention as hereinbefore set forth may be made without departing from the spirit and scope thereof, and therefore only such limitations should be imposed as are indicated in the appended claims.

I claim:

1. A suspension system for use in a railway car for mounting the car body on the axle for vertical and lateral movement with respect thereto, said system including vertically compressible fluid pressurized means attached to said body above said axle, restraining means interconnecting said vertically compressible means with said body to restrain movement of the same longitudinally of said body, biasing means connected to and extending from said vertically compressible means to said axle, said biasing means being limitedly pivotally connected with said axle to normally bias said body into an upright position, laterally compressible fluid pressurized means connected to and acting between said body and said biasing means to normally urge said body into an upright position, and a fluid pressure supply system carried by said body and interconnected with said fluid pressurized means to control fluid pressure carried thereby in response to the weight of said car body.

2. A suspension system for use in a railway car for mounting the car body on the axle for vertical and lateral movement with respect thereto, said system including vertically compressible fluid pressurized means attached to said body above said axle, restraining means interconnecting said vertically compressible means with said body to restrain movement of the same longitudinally of said body, biasing means connected to and extending from said vertically compressible means to said axle, said biasing means being limitedly pivotally connected with said axle to normally bias said body into an upright position, laterally compressible fluid pressurized means connected to and acting between said body and said biasing means to normally urge said body into an upright position, and a fluid pressure supply system carried by said body and interconnected with said fluid pressurized means to control fluid pressure carried thereby in response to the weight of said car body, said laterally compressible means being interconnected with said vertically compressible means to equalize fluid pressure therebetween.

3. A suspension system for use in a railway car for mounting the car body on the axle for vertical and lateral movement with respect thereto, said system including a laterally spaced pair of vertically compressible fluid pressurized means attached to said body above said axle, restraining means interconnecting the lowermost portion of each of said vertically compressible means with said body to restrain movement of the same longitudinally of said body, biasing means connected to and extending from the lower portion of each of said vertically compressible means to said axle near opposite ends thereof, said biasing means being limitedly pivotally connected with said vertically compressible means and said axle to normally bias said body into an upright position, laterally compressible fluid pressurized means connected to and acting between said biasing means and said body to normally urge said body into an upright position, and a fluid pressure supply system carried by said body and interconnected with said fluid pressurized means to control fluid pressure carried thereby in response to the weight of said car body.

4. A suspension system for use in a railway car for mounting the car body on the axle for vertical and lateral movement with respect thereto, said system including a laterally spaced pair of vertically compressible fluid pressurized means attached to said body above said axle, restraining means interconnecting the lowermost portion of each of said vertically compressible means with said body to restrain movement of the same longitudinally of said body, biasing means connected to and extending from the lower portion of each of said vertically compressible means to said axle near opposite ends thereof, said biasing means being limitedly pivotally connected with said vertically compressible means and said axle to normally bias said body into an upright position, laterally compressible fluid pressurized means connected to and acting between said biasing means and said body to normally urge said body into an upright position, and a fluid pressure supply system carried by said body and interconnected with said fluid pressurized means to control fluid pressure carried thereby in response to the weight of said car body, said laterally compressible means being interconnected with said vertically compressible means to equalize fluid pressure therebetween.

5. A suspension system for use in a railway car for mounting the car body on the axle for vertical and lateral movement with respect thereto, said system including vertically compressible fluid pressurized means attached to said body above said axle, restraining means interconnecting said vertically compressible means with said body to restrain movement of the same longitudinally of said body, biasing means connected to and extending from said vertically compressible means to said axle, said biasing means being limitedly pivotally connected with said axle to normally bias said body into an upright position, laterally compressible fluid pressurized means connected to and acting between said body and said biasing means to normally urge said body into an upright position, and a fluid pressure supply system carried by said body and interconnected with said fluid pressurized means to control fluid pressure carried thereby in response to the weight of said car body, said laterally compressible means including an outer compressible portion internally supplied with fluid under pressure delivered from said fluid pressure supply system, said compressible portion being closed at its ends by substantially rigid walls, one of said walls being attached to said body and the other of said walls being carried by said biasing means, said compressible portion having internally positioned therein a resilient abutment means carried by one of said walls and directed toward the other of said walls for abutment with the other of said walls when movement of said body moves said walls a predetermined extent toward one another.

6. A suspension system for use in a railway car for mounting the car body on the axle for vertical and lateral movement with respect thereto, said system including vertically compressible fluid pressurized means attached to said body above said axle, restraining means interconnecting said vertically compressible means with said body to restrain movement of the same longitudinally of said body, biasing means connected to and extending from said vertically compressible means to said axle, said biasing means being limitedly pivotally connected with said axle to normally bias said body into an upright position, laterally compressible fluid pressurized means connected to and acting between said body and said biasing means to normally urge said body into an upright position, and a fluid pressure supply system carried by said body and interconnected with said fluid pressurized means to control fluid pressure carried thereby in response to the weight of said car body, said laterally compressible means including an outer compressible portion closed at its ends by substantially rigid walls, one of said walls being carried by said body and the other of said walls being carried by said suspension system, said compressible portion having internally positioned therein a resilient abutment means carried by one of said walls and directed toward the other of said walls for abutment with the other of said walls upon predetermined lateral movement between said body and said axle, said abutment means having a passageway therethrough which is connected to said fluid pressure supply system, said abutment means being resiliently compressible upon contact with one of said walls to ultimately limit movement of said walls toward one another at which point said passageway is collapsed and said fluid pressure supply system is no longer in communication with the interior of said compressible portion, the resiliency of said abutment means being adequate to re-establish communication upon a predetermined reverse movement of one of said walls away from the other of said walls.

7. A suspension system for use in a railway car for mounting the car body on the axle for vertical and lateral movement with respect thereto, said system including vertically compressible fluid pressurized means attached to said body above said axle, restraining means interconnecting said vertically compressible means with said body to restrain movement of the same longitudinally of said body, biasing means connected to and extending from said vertically compressible means to said axle, said biasing means being limitedly pivotally connected with said axle to normally bias said body into an upright position, laterally compressible fluid pressurized means connected to and acting between said body and said biasing means to normally urge said body into an upright position, and a fluid pressure supply system carried by said body and interconnected with said fluid pressurized means to control fluid pressure carried thereby in response to the weight of said car body, said laterally compressible means including an outer compressible portion which is internally fluid pressurized, said compressible portion being closed at its ends by substantially rigid walls, one of said walls being attached to said body and the other of said walls being carried by said biasing means, said compressible portion having internally positioned therein a resilient abutment means carried by one of said walls and directed toward the other of said walls for abutment with the other of said walls when movement of said body moves the wall associated therewith a predetermined extent toward the other of said walls, said laterally compressible means being interconnected with said vertically compressible means to equalize fluid pressure therebetween.

8. A fluid pressurized movement limiting means for use with a reversibly movable object, said limiting means including an outer compressible portion closed at its ends by substantially rigid walls, one of said walls being adapted for association with said movable object and the other of said walls being adapted for fixed positioning, said compressible portion having internally positioned therein a one-piece molded rubber resilient abutment means carried by one of said walls and directed toward the other of said walls for abutment with the other of said walls when movement of said object moves one of said walls toward the other, and fluid pressure supply means in the form of a passageway in said abutment means through which the interior of said compressible portion may be placed under variable pressure, said abutment means being resiliently compressible upon contact with one of said walls to ultimately limit movement of said walls toward one another prior to which point said passageway is blocked and said fluid pressure supply means is no longer in communication with the interior of said compressible portion, the resiliency of said abutment means being adequate to re-establish communication upon a predetermined reverse movement of one of said walls away from the other of said walls.

9. A fluid pressurized movement limiting means for use with a reversibly movable object, said limiting means including an outer compressible portion closed at its ends by substantially rigid walls, one of said walls being adapted for association with said movable object and the other of said walls being adapted for fixed positioning, said compressible portion having internally positioned therein a one-piece molded rubber resilient abutment means carried by one of said walls and directed toward the other of said walls for abutment with the other of said walls when movement of said object moves one of said walls toward the other to a predetermined extent, said abutment means being provided with an internal longitudinally extending passageway terminating at one end with an internal laterally extending passageway opening at its ends into the interior of said compressible portion and being spaced slightly inwardly from the innermost tip of said abutment means, the other end of said longitudinally extending passageway being aligned with an aperture in the wall carrying said abutment means, and a fluid pressure supply means connected with said longitudinally extending passageway to place the interior of said compressible portion under variable pressure, said abutment means being resiliently compressible upon contact with one of said walls to ultimately limit movement of said walls towards one another prior to which point said laterally extending passageway is sealed by compression of the rubber material defining and surrounding the same and said fluid pressure supply means is no longer in communication with the interior of said compressible portion, the active length and inherent resiliency of said abutment means being adequate to provide for continued limited movement of said walls relative to one another following passageway sealing therein and being further adequate to re-establish communication between said fluid pressure supply means and the interior of said compressible portion upon a predetermined reverse movement of one of said walls away from the other of said walls.

10. In a vehicle wherein a vehicle body is resiliently mounted by a suspension system on a wheel-carrying axle for vertical and lateral relative movement with respect to said suspension system and said axle, the provision of a lateral relative movement control means operatively connected to and between the vehicle body and said suspension system and being resiliently compressible in a substantially horizontal plane to control the extent of lateral movement of the vehicle body relative to said suspension system and said axle, said control means including an outer compressible portion internally supplied with fluid under pressure, and a fluid pressure supply system operatively connected with said vehicle body and said suspension system and said control means for varying the internal pressure of said control means in response to movement of said vehicle body relative to said suspension system and said axle.

11. In a vehicle wherein a vehicle body is resiliently mounted by a suspension system on a wheel-carrying axle for vertical and lateral relative movement with respect to said suspension system and said axle, the provision of a lateral relative movement control means operatively connected to and between the vehicle body and said suspension system and being resiliently compressible in a substantially horizontal plane to control the extent of lateral movement of the vehicle body relative to said suspension system and said axle, said control means including an outer compressible portion internally supplied with fluid under pressure, said compressible portion being closed at its ends by substantially rigid walls one of said walls being fixed to said vehicle body for movement therewith and the other of said walls being fixed to said suspension system, said compressible portion having internally positioned therein a resilient abutment means carried by one of said walls and directed toward the other of said walls for abutment with the other of said walls when movement of said vehicle body moves the wall associated therewith a predetermined extent toward the other of said walls, and a fluid pressure supply system operatively connected with said vehicle body and said suspension system and said control means for varying the internal pressure of said control means in response to movement of said vehicle body relative to said suspension system and said axle.

12. In a vehicle wherein a vehicle body is resiliently mounted by a suspension system on a wheel-carrying axle for vertical and lateral relative movement with respect to said suspension system and said axle, the provision of a lateral relative movement control means operatively connected to and between the vehicle body and said suspension system and being resiliently compressible in a substantially horizontal plane to control the extent of lateral movement of the vehicle body relative to said suspension system and said axle, said control means including an outer compressible portion closed at its ends by substantially rigid walls, one of said walls being fixed to said vehicle body for movement therewith and the other of said walls being fixed to an element of said suspension system, said compressible portion having internally positioned therein a resilient abutment means carried by one of said walls and directed toward the other of said walls for abutment with the other of said walls upon predetermined relative movement between said vehicle body and said suspension system and said axle, and a fluid pressure supply system which is operable in response to movement of said vehicle body relative to said suspension system and said axle operatively connected with said vehicle body and said suspension system and with said abutment means through a passageway therein to place the interior of said compressible portion under variable pressure, said abutment means being resiliently compressible upon contact with one of said walls to ultimately limit movement of said walls toward one another at which point said passageway is resiliently blocked and said fluid pressure supply system is no longer in communication with the interior of said compressible portion, the resiliency of the material of said abutment means being adequate to re-establish communication upon a predetermined reverse movement of one of said walls away from the other of said walls.

13. In a vehicle wherein a vehicle body is resiliently mounted by a suspension system on a wheel-carrying axle for vertical and lateral relative movement with respect to said suspension system and said axle, the provision of a lateral relative movement control means operatively connected to and between the vehicle body and said suspension system and being resiliently compressible in a substantially horizontal plane to control the extent of lateral movement of the vehicle body relative to said suspension system and said axle, said control means including an outer compressible portion closed at its ends by substantially rigid walls, one of said walls being fixed to said vehicle body for movement therewith and the other of said walls being carried by said suspension system, said compressible portion having internally positioned therein a resilient abutment means carried by one of said walls and directed toward the other of said walls for abutment with the other of said walls upon a predetermined extent of relative movement between said vehicle body and said suspension system and said axle, and a fluid pressure supply system operatively connected with said vehicle body and said suspension system and with said abutment means to place the interior of said compressible portion under variable pressure, said abutment means being provided with an internal longitudinally extending passageway terminating at one end with an internal laterally extending passageway opening at its ends into the interior of said compressible portion, the other end of said longitudinally extending passageway communicating with said fluid pressure supply system, said abutment means being resiliently compressible upon contact with one of said walls to ultimately limit movement of said walls toward one another at which point said internal laterally extending passageway is collapsed to an extent that said fluid pressure supply system is no longer in communication with the interior of said compressible portion, said abutment means being adapted to re-establish communication between the interior of said compressible portion and said fluid pressure supply system upon a predetermined reverse movement of one of said walls away from the other of said walls due to the inherent resiliency of the material of said abutment means.

14. In a vehicle wherein a vehicle body is resiliently mounted by a suspension system on a wheel-carrying axle for vertical and lateral relative movement with respect to said suspension system and said axle, and the vertical relative movement is controlled by fluid pressure operated vertically acting means forming a part of said suspension system and in communication with fluid supply means on said vehicle body for supplying fluid under pressure to said vertically acting means, the operating pressure of said vertically acting means being regulated by fluid pressure control means forming a part of said fluid supply means and being operatively connected with said vehicle body and said suspension system to vary the operating pressure of said vertically acting means in response to movement of said vehicle body relative to said suspension system, the provision of a lateral relative movement control means operatively connected to and between the vehicle body and said suspension system and being resiliently compressible in a substantially horizontal plane to control the extent of lateral movement of the vehicle body relative to said suspension system and said axle, said lateral movement control means including an outer compressible portion, said fluid supply means being operatively connected with said lateral movement control means to supply fluid under pressure to said compressible portion to vary the internal pressure thereof on the order of variations in the operating pressure of said vertically acting means.

15. In a vehicle wherein a vehicle body is resiliently mounted by a suspension system on a wheel-carrying axle for vertical and lateral relative movement with respect to said suspension system and said axle, and the vertical relative movement is controlled by fluid pressure operated vertically acting means forming a part of said suspension system and in communication with fluid supply means on said vehicle body for supplying fluid under pressure to said vertically acting means, the operating pressure of said vertically acting means being regulated by fluid pressure control means forming a part of said fluid supply means and being operatively connected with said vehicle body and said suspension system to vary the operating pressure of said vertically acting means in response to movement of said vehicle body relative to said axle, the provision of a lateral relative movement control means operatively connected to and between the vehicle body and said suspension system and being resiliently compressible in a substantially horizontal plane to control the extent of lateral movement of the vehicle body relative to said suspension system and said axle, said lateral movement control means including an outer compressible portion, said fluid supply means being operatively connected with said lateral movement control means to supply fluid under pressure to said compressible portion to vary the internal pressure thereof on the order of variations in the operating pressure of said vertically acting means, said compressible portion being closed at its ends by substantially rigid walls, one of said walls being attached to said vehicle body and the other of said walls being fixed to said suspension system, said compressible portion having internally positioned therein a resilient abutment means carried by one of said walls and directed toward the other of said walls for abutment with the other of said walls when movement of said vehicle body moves the wall attached thereto a predetermined extent toward the other of said walls.

16. In a vehicle wherein a vehicle body is resiliently mounted by a suspension system on a wheel-carrying axle for vertical and lateral relative movement with respect to said suspension system and said axle, and the vertical relative movement is controlled by fluid pressure operated vertically acting means forming a part of said suspension system and in communication with fluid supply means on said vehicle body for supplying fluid under pressure to said vertically acting means, the operating pressure of said vertically acting means being regulated by fluid pressure control means forming a part of said fluid supply means and being operatively connected with said vehicle body and suspension system to vary the operating pressure of said vertically acting means in response to movement of said vehicle body relative to said axle, the provision of a lateral relative movement control means operatively connected to and between the vehicle body and said suspension system and being resiliently compressible in a substantially horizontal plane to control the extent of lateral movement of the vehicle body relative to said suspension system and said axle, said lateral movement control means including an outer compressible portion in communication with said fluid supply means and internally supplied with fluid under pressure, said compressible portion being closed at its ends by substantially rigid walls, one of said walls being attached to said vehicle body and the other of said walls being carried by said suspension system, said compressible portion having internally positioned therein a resilient abutment means carried by one of said walls and directed toward the other of said walls for abutment with the other of said walls upon predetermined relative movement between said vehicle body and said axle, said abutment means being resiliently compressible upon contact with one of said walls to ultimately limit movement of said walls toward one another at which point the fluid supply means is no longer in communication with the interior of said compressible portion, the resiliency of the material of said abutment means being adequate to re-establish communication upon a predetermined reverse movement of one of said walls away from the other of said walls, said fluid pressure control means functioning to vary the internal pressure of said lateral movement control means on the order of variations in the operating pressure of said vertically acting means.

17. In a vehicle wherein a vehicle body is resiliently mounted by a suspension system on a wheel-carrying axle for vertical and lateral movement with respect to said suspension system and said axle, and the vertical relative movement is controlled by fluid pressure operated vertically acting means forming a part of said suspension system and in communication with fluid supply means on said vehicle body for supplying fluid under pressure to said vertically acting means, the operating pressure of said vertically acting means being regulated by fluid pressure control means forming a part of said fluid supply means and being operatively connected with said vehicle body and said suspension system to vary the operating pressure of said vertically acting means in response to movement of said vehicle body relative to said axle, the provision of a lateral relative movement control means operatively connected to and between the vehicle body and said suspension system to control the extent of lateral movement imparted to said vehicle body, said lateral movement control means including an outer compressible portion in communication with said fluid supply means and internally supplied with fluid under pressure, said compressible portion being closed at its ends by substantially rigid walls, one of said walls being attached to said vehicle body and the other of said walls being carried by said suspension system, said compressible portion having internally positioned therein a resilient abutment means carried by one of said walls and adapted for abutment with the other of said walls upon a predetermined extent of relative movement between said vehicle body and said axle, said abutment means being provided with an internal longitudinally extending passageway terminating at one end with an internal laterally extending passageway opening at its ends into the interior of said compressible portion, the other end of said longitudinally extending passageway being in communication with said fluid supply means for the introduction of fluid pressure into the interior of said compressible portion, said abutment means being resiliently compressible upon contact with one of said walls to ultimately limit movement of said walls toward one another at which point said internal laterally extending passageway is collapsed to an extent that the supply of fluid pressure is temporarily interrupted, said abutment means being adapted to re-establish the supply of fluid pressure upon a predetermined reverse movement of one of said walls away from the other of said walls due to the inherent resiliency of material of said abutment means, said fluid pressure control means functioning to vary the internal pressure of said lateral movement control means on the order of variations in the operating pressure of said vertically acting means.

18. In a vehicle wherein a vehicle body is resiliently mounted by a suspension system on a wheel-carrying axle for vertical and lateral relative movement with respect to said suspension system and said axle, said suspension system including fluid pressurized vertically acting means for controlling relative vertical movement, fluid supply means on said vehicle body for supplying fluid under pressure to said fluid pressurized vertically acting means, said fluid supply means including fluid pressure control means operated in response to relative movement between said body and said axle, and body centering means resiliently interconnecting said body and said axle for resiliently biasing said body into an upright position, the provision of lateral relative movement control means including fluid pressure operated means operatively connected in a substantially horizontal plane to and between said body and said body centering means, said fluid pressure operated means being in communication with said fluid supply means for functioning in response to changes in pressure in said vertically acting means, said fluid pressure operated means being expansible in response to fluid pressure to resiliently bias said body into an upright position in cooperation with the biasing action of said body centering means.

19. In a vehicle wherein a vehicle body is resiliently mounted by a suspension system on a wheel-carrying axle for vertical and lateral relative movement with respect to said suspension system and said axle, said suspension system including fluid pressurized vertically acting means for controlling relative vertical movement, fluid supply means on said vehicle body for supplying fluid under pressure to said vertically acting means, said fluid supply means including fluid pressure control means operated in response to relative vertical movement between said vehicle body and said axle, and body centering means resiliently interconnecting said vehicle body and said axle for resiliently biasing said vehicle body into an upright position, the provision of lateral relative movement control means operatively connected to and between said vehicle body and said body centering means and in communication with said vertically acting means to function in response to changes in the fluid pressure of said vertically acting means to resiliently bias said vehicle body into an upright position in cooperation with the biasing action of said body centering means, said lateral movement control means including an outer compressible portion internally supplied with fluid under pressure, said compressible portion being closed at its ends by substantially rigid walls, one of said walls being carried by said vehicle body and the other of said walls being fixed to said body centering means, said compressible portion having internally positioned therein a resilient abutment means carried by one of said walls and directed toward the other of said walls for abutment with the other of said walls when movement of said vehicle body moves said walls a predetermined extent toward one another.

20. In a vehicle wherein a vehicle body is resiliently mounted by a suspension system on a wheel-carrying axle for vertical and lateral relative movement with respect to said suspension system and said axle, said suspension system including fluid pressurized vertically acting mean for controlling relative vertical movement, fluid supply means on said vehicle body for supplying fluid under pressure to said vertically acting means, said fluid supply means including fluid pressure control means operated in response to relative vertical movement between said vehicle body and said axle, and body centering means resiliently interconnecting said vehicle body and said axle for resiliently biasing said vehicle body into an upright position, the provision of lateral relative movement control means operatively connected to and between said vehicle body and said body centering means and in communication with said vertically acting means to function in response to changes in the fluid pressure of said vertically acting means to resiliently bias said body into an upright position in cooperation with the biasing action of said body centering means, said lateral movement control means including an outer compressible portion closed at its ends by substantially rigid walls, one of said walls being carried by said vehicle body and the other of said walls being attached to said body centering means, said compressible portion having internally positioned therein a resilient abutment means carried by one of said walls and directed toward the other of said walls for abutment with the other of said walls upon predetermined relative movement between said vehicle body and said axle, said abutment means having a passageway therethrough which is in communication with the fluid pressure of said vertically acting means, said abutment means being resiliently compressible upon contact with one of said walls to ultimately limit movement of said walls toward one another at which point said vertically acting means is no longer in communication with the interior of said compressible portion, the resiliency of the material of said abutment means being adequate to re-establish communication upon a predetermined reverse movement of one of said walls away from the other of said walls.

21. In a vehicle wherein a vehicle body is resiliently mounted by a suspension system on a wheel-carrying axle for vertical and lateral relative movement with respect to said suspension system and said axle, said suspension system including fluid pressurized vertically acting means for controlling relative vertical movement, fluid supply means on said vehicle body for supplying fluid under pressure to said vertically acting means, said fluid supply means including fluid pressure control means operated in response to relative vertical movement between said vehicle body and said axle, and body centering means resiliently interconnecting said vehicle body and said axle for resiliently biasing said vehicle body into an upright position, the provision of lateral relative movement control means operatively connected to and between said vehicle body and said body centering means and in communication with said vertically acting means to function in response to changes in the fluid pressure of said vertically acting means to resiliently bias said body into an upright position in cooperation with the biasing action of said body centering means, said lateral movement control means including an outer compressible portion closed at its ends by substantially rigid walls, one of said walls being carried by said vehicle body and the other of said walls being carried by said body centering means, said compressible portion having internally positioned therein a resilient abutment means carried by one of said walls and directed toward the other of said walls for abutment with the other of said walls upon a predetermined extent of relative movement between said vehicle body and said axle, said abutment means being provided with an internal longitudinally extending passageway terminating at one end with an internal laterally extending passageway opening at its ends into the interior of said compressible portion, the other end of said longitudinally extending passageway communicating with said vertically acting means, said abutment means being resiliently compressible upon contact with one of said walls to ultimately limit movement of said walls toward one another at which point said internal laterally extending passageway is collapsed to an extent that the fluid pressure of said vertically acting means is no longer operative within the interior of said compressible portion, said abutment means being adapted to re-establish communication between the interior of said compressible portion and said vertically acting means upon a predetermined reverse movement of one of said walls away from the other of said walls due to the inherent resiliency of the material of said abutment means.

References Cited in the file of this patent

UNITED STATES PATENTS

| | | |
|---|---|---|
| 36,498 | Alsop | Sept. 23, 1862 |
| 2,056,106 | Kuhn | Sept. 29, 1936 |
| 2,115,072 | Hunt et al. | Apr. 26, 1938 |
| 2,180,860 | Brown | Nov. 21, 1939 |
| 2,427,927 | Schutte | Sept. 23, 1947 |
| 2,537,637 | Candlin | Jan. 9, 1951 |
| 2,596,031 | Kaufman | May 6, 1952 |
| 2,633,811 | Poage | Apr. 7, 1953 |
| 2,758,549 | Lich | Aug. 14, 1956 |
| 2,773,686 | Nash | Dec. 11, 1956 |